Jan. 4, 1938.  W. W. WOHLFARTH  2,104,284
TRUCK SUSPENSION
Filed June 22, 1936  3 Sheets-Sheet 1
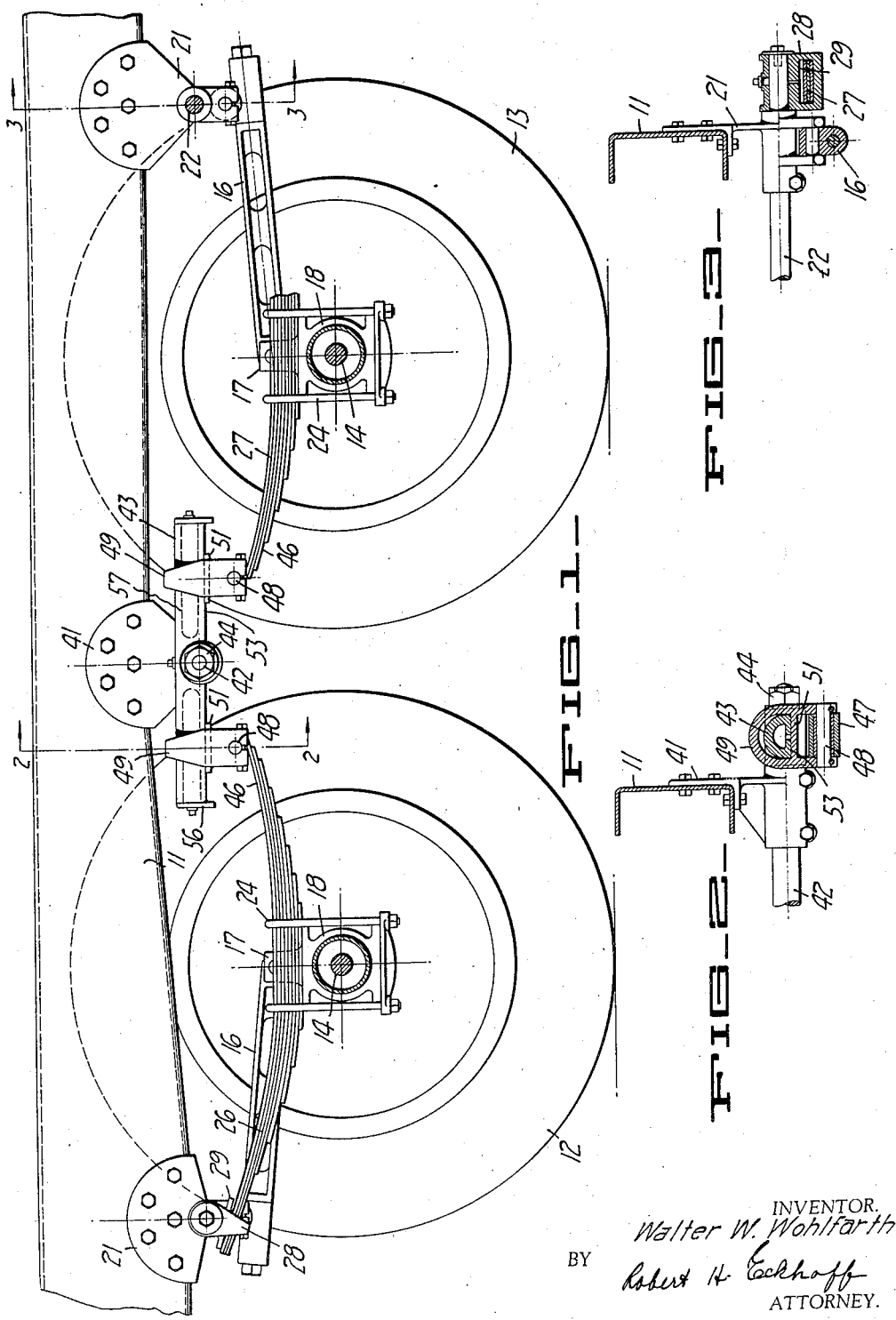
INVENTOR.
Walter W. Wohlfarth
BY Robert H. Eckhoff
ATTORNEY.

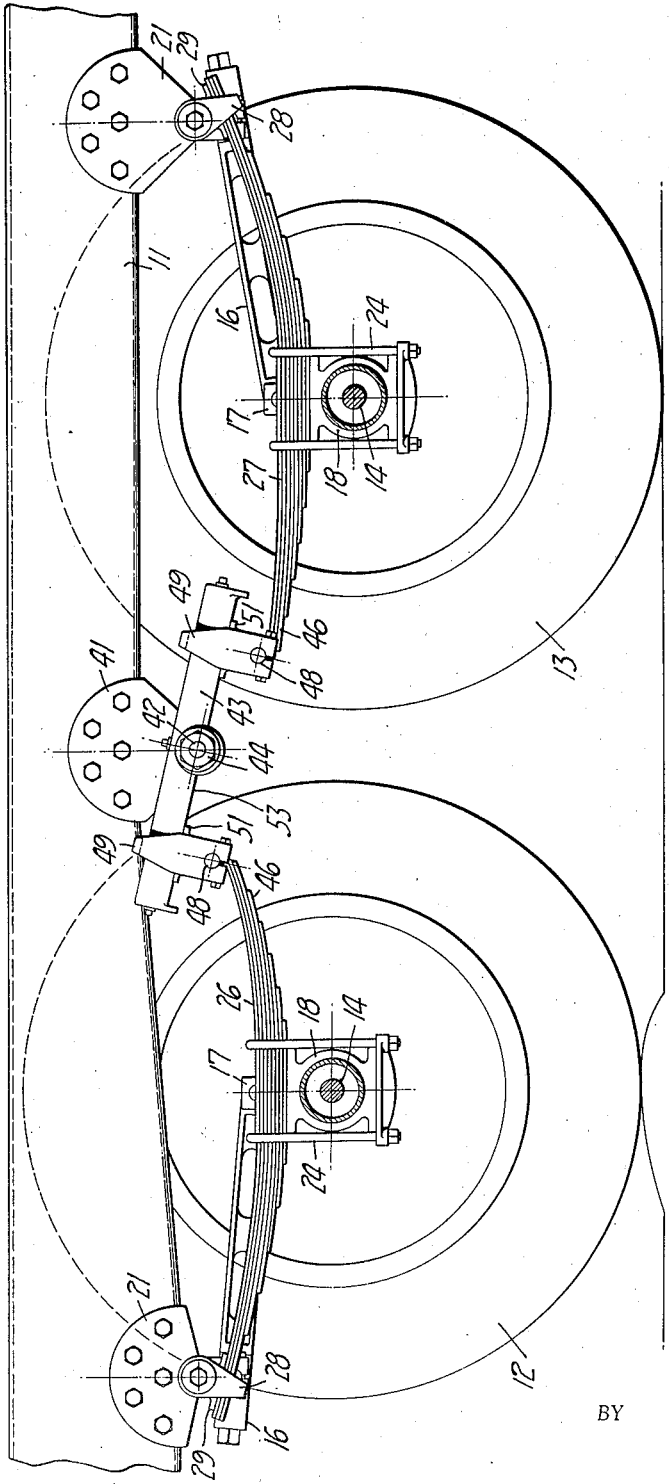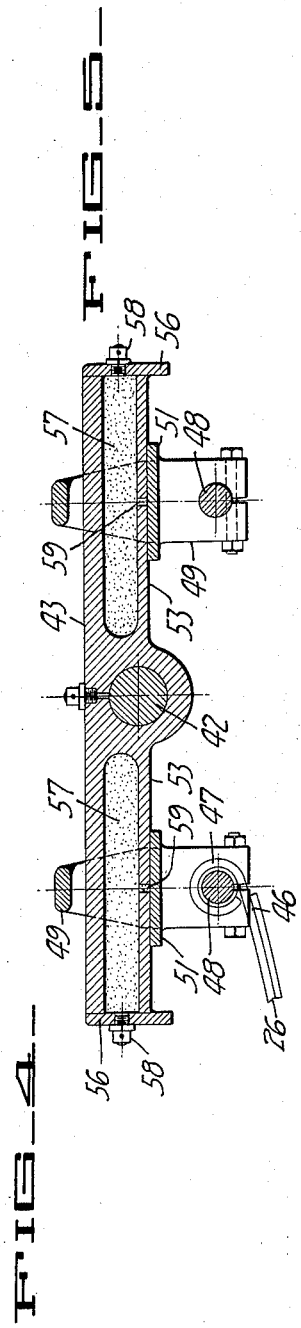

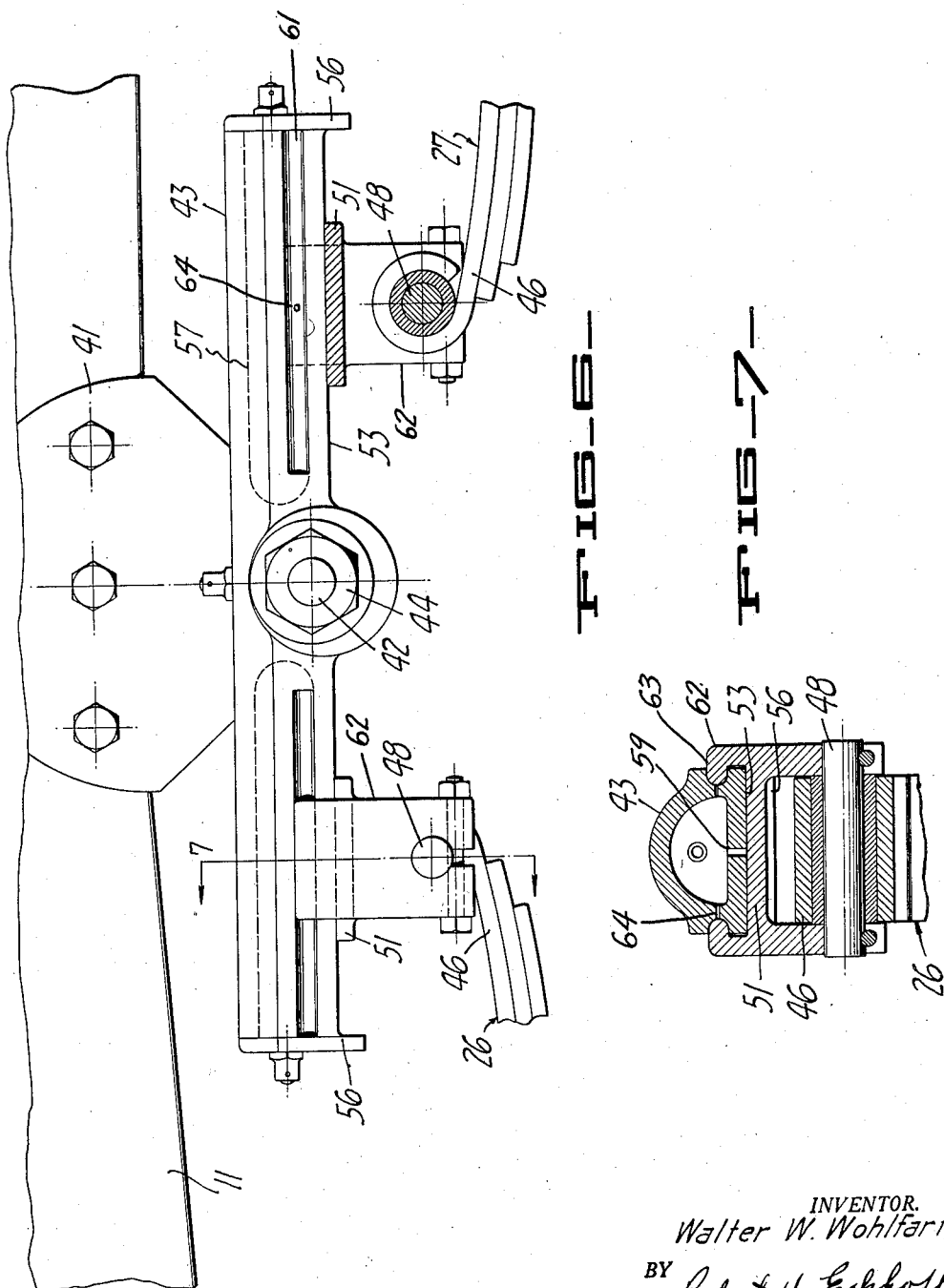

Patented Jan. 4, 1938

2,104,284

UNITED STATES PATENT OFFICE 2,104,284

TRUCK SUSPENSION

Walter W. Wohlfarth, San Francisco, Calif., assignor to A. Ted Ashjian and J. B. Sweet, both of Fresno, Calif.

Application June 22, 1936, Serial No. 86,468

2 Claims. (Cl. 267—56)

This invention relates to a vehicle construction, particularly to a suspension for a pair of adjacent trucks on a vehicle.

It is an object of the present invention to provide a truck suspension and a truck mounting on a vehicle suitable for and enabling the use of adjacent pairs of trucks.

Another object of the present invention is to provide an improved truck suspension.

A further object of the present invention is to provide for the mounting of a pair of adjacent trucks in such a manner that both trucks are rendered effective to support the vehicle irrespective substantially of the configuration of the surface over which the trucks are advanced.

A still further object of the present invention is to provide a mounting with spring supported trucks enabling adjacent trucks to accommodate themselves to the roadway while providing for adequate lubrication of certain of the supporting parts for the truck.

The invention includes other objects and features of advantage, some of which, together with the foregoing, will appear hereinafter wherein the present preferred form of the invention will be disclosed.

In the drawings accompanying and forming a part hereof Figure 1 is a side elevation, partly cut away, illustrating the truck suspension of my invention.

Figure 2 is a section taken along the line 2—2 of Figure 1.

Figure 3 is a section taken along the line 3—3 of Figure 1.

Figure 4 is a side elevation, similar to that in Figure 1 but illustrating how the truck supporting means operates as the truck passes over a roadway which is not a continuous smooth surface.

Figure 5 is a section taken through supporting means useful in connection with the present invention.

Figure 6 is a side elevation illustrating another form of construction of the member 43 and attachment of the two springs to it.

Figure 7 is a section taken along the line 7—7 of Figure 6.

In the embodiment of the invention shown in the drawings a frame 11 is provided with a wheel 12 and a wheel 13. The wheels 12 and 13 are typical of truck supporting means and it is to be understood that two other wheels are provided upon the other side of the frame 11 so that the frame is supported by a pair of trucks respectively provided by wheels 12 and 13 in pairs. Each pair of wheels are carried upon an axle 14 extended at right angles to the frame 11. An arm 16 extends between ear 17 on axle casting 18 and is suitably attached to a bracket 21 on the frame 11. The arms are provided in pairs for each axle and each pair of arms 16 position the truck with which they are associated transversely with respect to the frame for permitting movement of the truck with respect to the frame.

To support the trucks in a desired position with respect to the frame and to provide for springing of the load of the frame, springs 26 and 27 are provided. Each spring is secured to axle casting 18 by U bolts 24. Spring 26 is associated with the forward truck, there being one on each side of the frame 11 while spring 27 is associated with the rear truck, there being one on each side of the frame 11. The left hand end of spring 26 and the right hand end of spring 27 are slidably supported in member 28 which is mounted upon shaft 22 extending between associated pairs of brackets 21. Member 28 is apertured to receive the end of each spring and includes a flat portion 29 thereon to distribute the load upon the spring and permit sliding of the spring end. The outer ends of springs 26 and 27 are thus suitably positioned.

The prior art practice has been to attach the other end of the springs 26 and 27 independently of each other and directly to the frame. However, I have found that this is undesirable. For example, considering Figure 4, it is to be noted that wheel 12 is shown passing over a raised portion in a roadway. If spring 26 were attached directly to the frame, this would result in a raising of the wheel 13 and would result in all the load, normally carried by wheels 12 and 13 on one side of the truck, being placed upon wheel 12 and its spring 26. This results in undue tire wear, a possible breakage of spring 26 and an undue stressing of one of the trucks. As a matter of fact, it illustrates very clearly an utter failure in design for such obstructions are common and although two trucks have been provided to care for the load of the vehicle only one is functioning to carry that load.

In accordance with the present invention, means are provided for distributing the load substantially at all times between the two trucks so that the trucks act to distribute the load to the roadway substantially irrespective of the configuration thereof. This I accomplish in the form disclosed herein, by attaching brackets 41 on opposite sides of the frame 11 and extending a shaft 42 between them. Upon this shaft I mount for an oscillatory movement a member 43. Nut 44 retains the member in place upon the shaft. This member is mounted substantially at its midpoint upon the shaft 42, there being one member provided on each side of the frame. The unattached ends 46 of each spring include an eye 47 through which passes pin 48. Pin 48 is carried between the legs of U member 49 which is slipped onto a member 43, there being a U member provided for each spring end. A bearing plate 51 is provided between the legs of the U member to bear against bearing face 53 on member 43.

In use, the member 43 acts to accommodate each wheel to the position of the other. Thus, if the wheel 12 rises over obstruction and wheel 13 remains upon the roadway, member 43 oscillates about the supporting shaft and permits wheel 12 to rise while wheel 13 remains in contact with the supporting roadway. This movement is further enhanced by the load placed upon the wheels by the weight of the supported vehicle. It is to be noted that the movement of the wheel 12 does not result directly in a corresponding movement of wheel 13 since the supports for the two wheels, namely the U members, are free to move independently of each other along the supporting surface 53 of member 43. Thus if at the instant wheel 12 rose over an obstruction in the roadway wheel 13 should happen to drop into a chuck hole, the supporting U member for the wheel 13 is free to move along member 43 to a position in which a substantially equal weight distribution is secured of the load placed upon the wheels.

In accordance with this invention, means are provided for lubricating the surfaces 51 and 53 which bear against each other. This is accomplished by welding plates 56 onto the ends of member 43 which includes on each side of the bearing point thereof chambers 57. Plates 56 preferably depend below the member 43 so that the U members cannot be slipped off, a greasing attachment 58 is provided on each plate so that lubricant under pressure can be forced into the chambers 57 through which the lubricant is released through passage 59.

In Figures 6 and 7 I have shown another modification in which the member 43 is provided with groove 61. Members 62 are similar to the U-members 49 except that instead of extending around the arms 43 the member is provided with extensions 63 on opposite sides thereof which fit in and slide in the grooves. This structure has the advantage that a possible binding between plate 51 and member 43 is obviated. In some instances, I observe that the top of the U-member would bind upon the arm 43 and would prevent the U member from sliding. The present structure obviates the possibility of this binding and provides for a sliding connection between the end of the spring and the member 43 in substantially all positions of the member 43.

Grease bleed holes 64 are provided along each groove so that member 62 is amply lubricated as it moves up and down the groove.

I claim:

1. A spring supporting structure comprising a bracket securable to a supporting frame and having a shaft extending therefrom substantially transversely to and beyond said frame, a spring hanger member mounted at about its middle for rotation on said shaft with said hanger member extending on each side of said shaft substantially parallel to said frame, said member having an elongated planar bottom face on each side of said shaft with grooves formed in the opposite sides of said hanger member, a spring support member positioned on each side of said shaft, each support member having a face complementary to and slidable along said planar bottom face and arms extending upwardly from said face along the sides of said hanger member and fitting slidably in said grooves.

2. A spring supporting structure comprising a bracket securable to a supporting frame and having a shaft extending therefrom substantially transversely to and beyond said frame, a spring hanger member mounted at about its middle for rotation on said shaft with said hanger member extending on each side of said shaft substantially parallel to said frame, said member having an elongated planar bottom face on each side of said shaft with grooves formed in the opposite sides of said hanger member, a spring support member positioned on each side of said shaft, each support member having a face complementary to and slidable along said planar bottom face and arms extending upwardly from said face along the sides of said hanger member and fitting slidably in said grooves, each end of said hanger member being hollow to receive a lubricant, and a passage for lubricant from within said member to said planar face and to said grooves.

WALTER W. WOHLFARTH.